United States Patent [19]

Nelson

[11] Patent Number: 5,529,022
[45] Date of Patent: Jun. 25, 1996

[54] ANIMAL LITTER CONTAINING MAGNESIUM MONTMORILLONITE

[76] Inventor: Thomas E. Nelson, 706 Creekside La., Houston, Tex. 77024-3211

[21] Appl. No.: 176,823

[22] Filed: Jan. 3, 1994

[51] Int. Cl.⁶ .................................................. A01K 1/015
[52] U.S. Cl. ............................................................ 119/173
[58] Field of Search .............................. 119/173; 502/80

[56] References Cited

U.S. PATENT DOCUMENTS

| | | | |
|---|---|---|---|
| 4,686,937 | 8/1987 | Rosenfeld | 119/173 |
| 5,129,365 | 7/1992 | Hughes | 119/173 |
| 5,188,064 | 2/1993 | House | 119/173 X |
| 5,193,489 | 3/1993 | Hardin | 119/173 |

*Primary Examiner*—Robert P. Swiatek
*Attorney, Agent, or Firm*—Anastassios Triantaphyllis

[57] ABSTRACT

An animal litter comprising a magnesium montmorillonite alone or in combination with other animal litter material.

11 Claims, No Drawings

ANIMAL LITTER CONTAINING MAGNESIUM MONTMORILLONITE

TECHNICAL FIELD

The present invention relates to the field of animal litters and, more particularly, to an animal litter containing a clay material. Still more particularly, the present invention relates to an animal litter wherein the animal litter contains magnesium montmorillonite.

BACKGROUND OF THE INVENTION

Animal litters containing fuller's earth clays are well known in the art. More particularly fuller's earth clays are comprised of the clay minerals attapulgite, bentonite or various other alumino silicates and have been used in connection with animal litters, alone or in combination with other substances. Attapulgite is a clay mineral whose major constituent is attapulgite. It may also contain varying amounts of other clay minerals such as calcium montmorillonite and sepialite. Attapulgite clay is relatively expensive. Bentonite is a clay mineral that consists principally of sodium and/or calcium montmorillonite and lesser amounts of other clay minerals. The sodium form occurs in the western U.S. and calcium form occurs chiefly in the midwest and southern United States of America.

In most applications, the fuller's earth clay is calcined (dried) by heating it to a finishing temperature of more than 180° C. to remove all of the free moisture and a portion or all of the interstitial moisture of the clay. The advantage of calcining the fuller's earth clays to above 180° C. for use an animal litters is that this hardens them so they do not form dust by the particles abrading against each other. In the case of attapulgite, clay heated to a finishing temperature higher than 180° C. but less than 1000° C. is called fully calcined and is known as a lower volatile material ("LVM") clay. Such clay has no free moisture but some interstitial moisture. Fuller's earth clays which are calcined by heating them to a finishing temperature of more than 180° C. are non-colloidal. Non-colloidal clays are those that do not form colloids when dispersed in a liquid environment such as water.

One disadvantage of the above described calcined, non-colloidal fuller's earth clays when used as an animal litter is that they do not form clumps when exposed to urine, or, if they do, such clumps are not cohesive. The clumps, for example, formed by attapulgite LVM clay disintegrate completely when removed or dislodged. Another disadvantage is that they do not absorb the urine readily whereby the urine accumulates at the bottom of the litter box.

In order to improve the clumping and absorbing properties of fuller's earth clays, the clays are sometimes partially calcined to remove all or most of the free moisture thereof by heating them to a finishing temperature of not more than 180° C. usually 120° C. to 150° C. Such clays are colloidal in that they form a colloid when exposed to or dispersed in a liquid environment such as an aqueous environment. In the case of attapulgite, the partially calcined clay is known as regular volatile material ("RVM") clay. In the case of bentonite, the clay is often only dried sufficient to allow grinding. Such clay has a free moisture of 6–8% upon standing.

All bentonite (smectite) clays swell to some extent in the presence of water. The swelling properties of bentonite are related to the arrangement of the exchangeable cations present in the particular bentonite. The principal cations are sodium, calcium and magnesium. Sodium bentonites can swell up to six times of their initial volume whereas calcium bentonites swell only slightly and magnesium bentonites swell about one half of their original volume. In commercial usage, a water-swellable bentonite is a sodium bentonite clay that hydrates in the presence of water, e.g., swells appreciably (six times or more of its initial volume) in the presence of water. On the contrary, in commercial usage, calcium and magnesium bentonites are not referred to as water swellable bentonites. One disadvantage of the water swellable bentonites is that, because of the significant swelling occurring upon their contact with water, they plug up the toilet when flushed. Therefore, they can not be disposed of in this manner.

U.S. Pat. No. Re. 33,983 discloses an animal litter containing water-swellable bentonite clay that is capable of agglomerating upon contact with a liquid animal dross. One presently available animal litter containing bentonite is one wherein the bentonite is sodium montmorillonite. That bentonite swells significantly when contacted with water and its disposal through flushing down the toilet is expressly not recommended by its manufacturer because it plugs it up. Another bentonite-containing litter presently available is one wherein the bentonite is calcium montmorillonite. That litter is flushable. One disadvantage thereof, however, is that it does not form cohesive clumps when it contacts animal urine.

U.S. Pat. No. 4,437,429 discloses an improved animal litter that includes a non-colloidal fuller's earth clay and an effective amount of a hydrated zeolite. One disadvantage of the animal litter disclosed in that patent is that the entire litter box must be disposed of after a certain period of time.

U.S. Pat. No. 4,085,704 discloses an animal litter that produces a continuous, long lasting, uniform, slowly released odor control agent. The patent discusses the addition of non-colloidal fuller's earth clay to the animal litter to reduce the cost of the litter.

U.S. Pat. No. 4,532,890 make reference to Japanese Patent Application Laid-Open No. 129622/1982 that discloses the use of zeolite as a deodorizer together with a bentonite. The bentonite used is non-colloidal bentonite.

The present invention discloses an animal litter that contains a montmorillonite clay which is economical and which forms strong clumps upon contact with the animal urine. That clay does not swell appreciably in water. Therefore, the clumps are easily disposable by flushing them down the toilet.

These and other objects and advantages of the present invention will become readily apparent from the following description.

SUMMARY OF THE INVENTION

The present invention discloses an improved animal litter that contains a magnesium montmorillonite clay which is obtained by partially calcining the ore by heating it to a finishing temperature of not more than 180° C. When used as an animal litter, that clay forms strong and cohesive clumps when exposed to urine. X-ray diffraction indicates that the magnesium montmorillonite has a basal d-spacing in the range of about 14.7 to about 15.1 Å 52 percent relative humidity. Furthermore. the amount of the magnesium present is about twenty (20) percent or more of the cation exchangeable sites.

DETAILED DESCRIPTION OF THE INVENTION

According to the present invention an animal litter is prepared by using magnesium montmorillonite. Such animal litter is economical and forms strong cohesive clumps when exposed to urine. The clumps do not swell substantially so that they can be easily flashed down the toilet.

Montmorillonite is a form of bentonite clay. Montmorillonite clays contain exchangeable cations including sodium, calcium and magnesium. The ratios of the particular cations present can affect the properties of the montmorillonite including its swelling when exposed to water and its ability to form strong cohesive clumps. The swelling characteristics of the montmorillonite clays are sometimes identified and referred to by the predominant cation present therein. For example, a sodium bentonite (montmorillonite) is a swelling bentonite wherein the sodium cation is the predominant cation, and calcium montmorillonite is a non-swelling bentonite wherein the predominant cation is calcium. This method of identification is adopted herein when reference is made to montmorillonites wherein the predominant exchangeable cation is sodium or calcium. In the case of magnesium montmorillonites, however, the term "magnesium montmorillonite" as used herein shall mean a montmorillonite that contains magnesium cations, regardless as to whether magnesium is the predominant cation, and has a basal d-spacing in the range of about 14.7 to about 15.1 Å 52 percent relative humidity and a magnesium presence of about twenty (20) percent or more of the cation exchangeable sites.

Surprisingly and unexpectedly, an animal litter comprising a magnesium montmorillonite, as defined herein, forms strong and cohesive clumps when subjected to the animal urine and does not swell appreciably when exposed to water.

Magnesium montmorillonites suitable for use as animal litter in accordance with the present invention are any magnesium montmorillonites as defined above including a montmorillonite clay available in Texas (hereinafter referred to as the "Texas Magnesium Montmorillonite").

The montmorillonite is partially calcined to remove all or most of the free moisture thereof by heating it to a finishing temperature of not more than 180° C., usually 120° C. to 150° C. Such partially calcined clay is sufficiently dry for grinding.

The magnesium montmorillonite clays used herein are offered commercially in a broad range of particle sizes. Particle sizes are measured herein by sieve screen mesh sizes of the U.S. Standard Screen Series (ASTM Specification E-11-70 values). When two mesh sizes are used together and separated by a virgule ("/"), the first listed mesh size designates passage of the material through such mesh size and the second listed, larger-numbered mesh size designates retention of the material by such mesh size. For example, use of "8/16" indicates passage through an 8 mesh screen and retention by a 16 mesh screen. Similarly, use of a material or particles being of a "8/16 mesh size" refers to all material or particles whose size is such that they pass through an 8 mesh (3/32 inches) screen but are retained by a 16 mesh (3/64 inches) screen. Alternatively, it refers to all material or particles whose size is smaller than 8 mesh but larger than 16 mesh.

It is essential that the clay particles be sufficiently large to avoid the formation of dust and sufficiently small to form clumps. Accordingly the particle size can be of a 6/325 mesh size. If the size of the clay is sufficiently large so as not to pass through a 6 mesh (1/8 inches) size, the animal litter does not clump and the odor absorbing properties of the litter are reduced. If the size of the clay is sufficiently small so as to pass through a 325 mesh (44 microns) screen, the clay is in powder form. The clays are usually available in 8/16, 16/30, 24/48, 20/60, 30/60 or 60/90 and smaller mesh sizes. Accordingly, the clay particles may be of 8 mesh to 90 mesh (180 microns) size. The preferred mesh size is 16/30.

In general, one may practice the invention by using any magnesium montmorillonite, as defined above, alone or in combination with any other well known clumping animal litter material such as other clays. Accordingly, it may be used together with other clays so long as the amount of magnesium bentonite is about fifty percent or more of the total volume of the combined clay. Examples of such clays include diatomaceous earth, fuller's earth, and smectites.

The following example further illustrates the invention but is not to be construed as a limitation on the scope of the invention contemplated herein.

EXAMPLE 1

A Texas magnesium montmorillonite was partially calcined and ground. The material was placed in a cat litter box. When the material was exposed to the cat urine, it formed strong cohesive clumps without appreciable swelling.

The same material was compared to a Mississippi calcium montmorillonite and a Wyoming sodium montmorillonite. The three materials were subjected to an X-ray diffraction study, an extractable ion study, and a swelling study. The Texas montmorillonite was also subjected to a mineral structural composition analysis.

X-ray Diffraction

Approximately five grams of each material were separated using the hydrometer methods modified from ASTM D-422. In this case, the samples were soaked in distilled water for 16 hours rather than being treated with sodium hexametaphosphate prior to final dispersal and measurement. This was done to preserve the exchangeable cations in their natural state rather than exchange them by mass action to the sodium saturated form. Following the 16 hour soak, the samples were mechanically dispersed and placed in a hydrometer cylinder to determine the particle size distribution. The minus 3 micron clay size fraction was removed after 300 minutes. The 3 micron material was used to prepare oriented aggregates for a diffraction study.

The oriented aggregates were placed in a desiccator with a relative humidity of 52% (controlled by a saturated solution of magnesium sulfate) and left to equilibrate for 24 hours. Then, the samples were examined using conventional x-ray diffraction methods as quickly as possible to avoid any possible changes due to room humidity. The Texas magnesium montmorillonite showed a basal d-spacing of 14.8 Å at 52 percent relative humidity. The Mississippi calcium montmorillonite and the Wyoming sodium montmorillonite showed basal d-spacings of 15.5 Å and 12.7 Å, respectively, at 52 percent relative humidity. This difference in basal d-spacings indicates that the Texas magnesium montmorillonite has a different interlayer cation composition than the other two montmorillonites and, hence, a different degree of interlayer water absorbance.

Extractable Cations

One gram of minus 3 micron material was placed in 2N ammonium acetate solution and stirred at room temperature for 24 hours. The samples were then washed with distilled water and the filtrate was recovered and made to volume. The samples were then analyzed by ICP for the major extractable ions. The results which are shown in Table 1 indicate that, although calcium is the predominant cation in the Texas montmorillonite, a significant amount of magnesium is present on the exchange sites. This results in a basal d-spacing that is smaller than usual for a montmorillonite with predominantly calcium in the interlayer positions.

The basal d-spacing data and the extractable cation data are diagnostic for a magnesium versus a sodium or a calcium montmorillonite. Table 2.8 on page 61 of M. J. Wilson, A Handbook of Determinative Clay Mineralogy, Chapman and Hall, New York, 1987, shows basal spacings of magnesium montmorillonite and compares them with those of other clays. Table 3.1A on page 16 of R. E. Grim and N. Guven, Bentonites, Elsevier, New York, 1978 also shows similar data.

Free Swelling

Known volumes of Texas magnesium montmorillonite, Wyoming sodium montmorillonite and Mississippi calcium montmorillonite were placed in three separate graduated cylinders and water was added thereto. After 48 hours, the swelling of the Texas magnesium montmorillonite was about fifty to sixty percent of the initial volume, the swelling of the Wyoming sodium montmorillonite was more than 250 percent of the initial volume and the swelling of the Mississippi calcium montmorillonite was about 25 percent of the initial volume.

TABLE 1

Extractable Cations (meq/100 grams)

|  | Mg | Ca | K | Na |
|---|---|---|---|---|
| Texas Magnesium Montmorillonite | 20 | 51 | 2 | 16 |
| Mississippi Calcium Montmorillonite | 8 | 114 | 2 | 2 |
| Wyoming Sodium Montmorillonite | 6 | 30 | 2 | 62 |

Mineral Structural Composition

A sample of the minus 3 material of Texas montmorillonite was analyzed by a combination of x-ray fluorescence and atomic absorption methods. The results are shown in Table 2. The chemical analysis and the x-ray diffraction data for the Texas montmorillonite show that it is dioctahedral montmorillonite with mainly iron and aluminum in octahedral coordination. This distinguishes this material from the trioctahedral magnesium montmorillonite variety known as saponite where the structural magnesium is non-exchangeable.

TABLE 2

Chemical Composition of Texas Magnesium Montmorillonite

| Elements | Weight Percent |
|---|---|
| $SiO_2$ | 60.35 |
| $TiO_2$ | 0.54 |
| $Al_2O_3$ | 14.34 |
| $Fe_2O_3$ | 3.85 |
| MnO | 0.02 |
| MgO | 2.05 |
| CaO | 1.24 |
| $Na_2O$ | 0.08 |
| $K_2O$ | 0.89 |
| Li (ppm) | 6 |
| LOI | 16.00 |
| Total | 99.37 |

While the invention has been described herein in connection with certain preferred embodiments, modifications thereof can be made by one skilled in the art without departing from the spirit of the invention.

What is claimed is:

1. An animal litter, comprising magnesium montmorillonite that has a basal d-spacing in the range of about 14.7 to about 15.1 Å 52 percent relative humidity upon X-ray diffraction.

2. An animal litter according to claim 1 wherein the magnesium montmorillonite has a basal d-spacing of about 14.7 to about 14.8 Å 52 percent relative humidity.

3. An animal litter according to claim 1 wherein the amount of magnesium present is about twenty (20) percent or more of the cation exchangeable sites.

4. An animal litter according to claim 1 wherein the magnesium montmorillonite is partially calcined.

5. An animal litter according to claim 1 wherein the magnesium montmorillonite is of a 6/325 mesh size.

6. An animal litter according to claim 5 wherein the magnesium montmorillonite is of 8/60 mesh size.

7. An animal litter according to claim 6 wherein the magnesium montmorillonite is of 16/30 mesh size.

8. An animal litter according to claim 1 further including a second clay.

9. An animal litter according to claim 8 wherein the volume of magnesium montmorillonite is about fifty percent or more of the entire volume of the combined litter.

10. An animal litter according to claim 8 wherein the second clay is a partially calcined clay.

11. An animal litter according to claim 8 wherein the second clay is attapulgite or bentonite.

* * * * *